United States Patent
Dea

(10) Patent No.: US 9,184,675 B1
(45) Date of Patent: Nov. 10, 2015

(54) VARIABLE CAPACITOR BASED MECHANICAL TO ELECTRICAL GENERATOR

(75) Inventor: Jack Y. Dea, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 602 days.

(21) Appl. No.: 13/151,477

(22) Filed: Jun. 2, 2011

(51) Int. Cl.
  *H02N 1/00* (2006.01)
  *H02N 2/00* (2006.01)

(52) U.S. Cl.
  CPC ... *H02N 1/00* (2013.01); *H02N 2/00* (2013.01)

(58) Field of Classification Search
  CPC .................................. H02K 1/00; H02N 2/00
  USPC ............... 310/309, 322, 232.02, 323.06, 363, 310/367, 365; 65/25.4; 361/278, 289; 322/2 R
  See application file for complete search history.

(56) References Cited

U.S. PATENT DOCUMENTS

| | | | |
|---|---|---|---|
| 3,358,215 A | | 12/1967 | Swan |
| 3,405,334 A | * | 10/1968 | Jewett et al. ................... 361/289 |
| 2006/0234851 A1 | * | 10/2006 | Kawano et al. ............... 501/134 |
| 2011/0259717 A1 | * | 10/2011 | Pillans et al. ................. 200/181 |

* cited by examiner

*Primary Examiner* — Hanh Nguyen
*Assistant Examiner* — Jose Gonzalez Quinones
(74) *Attorney, Agent, or Firm* — SSC Pacific Patent Office; Arthur K. Samora; Kyle Eppele

(57) ABSTRACT

A variable capacitor based electrical generator is described, using a detached conformal electrode that substantially conforms to surface irregularities of the exposed side of the dielectric. The conformal electrode increases the capacitance difference between a contacting state and non-contacting state. Consequently, by displacing the conformal electrode or dielectric, the capacitance can be significantly varied. By pre-charging the electrodes and by providing a displacement power source (wind, vibration, etc), power can be generated and converted into an electrical form. By networking or arranging a plurality of varactors, a significant power generator can be obtained. This system can be operated even at very low frequencies as compared to conventional magnetic generators.

11 Claims, 5 Drawing Sheets

VARIABLE CAPACITOR BASED MECHANICAL TO ELECTRICAL GENERATOR

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Reference Navy Case No. 100708.

BACKGROUND

This disclosure relates generally to the field of energy harvesting. More particularly, this disclosure relates to energy harvesting utilizing a mechanical to electrical generator based on a variable capacitor.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a variable capacitor (varactor) is provided, comprising: a solid dielectric having two opposing sides, with an integrally attached electrode on one side of the dielectric; a conformal electrode formed in an initial fluid or molten state on an exposed other side of the dielectric, substantially conforming to surface irregularities of the exposed side of the dielectric, and removably displaceable from the dielectric; at least one guide between the conformal electrode and the dielectric, providing substantially perpendicular alignment of the conformal electrode with the other side surface of the dielectric during movement; pre-charging the conformal electrode and integrally attached electrode; and a displacement mechanism coupled to either the conformal electrode or to at least one of the dielectric and attached electrode, providing displacement substantially perpendicular to a junction of the conformal electrode and dielectric surface, wherein a capacitance is varied by displacing the conformal electrode from a surface of the exposed side of the dielectric.

In another aspect of the disclosed embodiments, a varactor-based electrical power generator is provided, comprising: a solid dielectric having two opposing sides, with an integrally attached electrode on one side of the dielectric; a conformal electrode formed in an initial fluid or molten state on an exposed other side of the dielectric, substantially conforming to surface irregularities of the exposed side of the dielectric, and removably displaceable from the dielectric; at least one guide between the conformal electrode and the dielectric, providing substantially perpendicular alignment of the conformal electrode with the other side surface of the dielectric during movement; pre-charging the conformal electrode and the integrally attached electrode, providing a voltage across the conformal electrode and the integrally attached electrode; a displacement mechanism coupled to either the conformal electrode or to at least one of the dielectric and the attached electrode, providing repeating displacement substantially perpendicular to a junction of the conformal electrode and dielectric surface, wherein a capacitance is varied by varying a displacement between the conformal electrode and a surface of the exposed side of the dielectric, and a power storage device coupled in series to either the conformal electrode or the attached electrode, storing generated power.

In another aspect of the disclosed embodiments, a varactor-based method for generating electrical power is provided, comprising: forming an electrode in an initial fluid or molten state on an exposed side of a solid dielectric having an integrally attached electrode on a non-exposed side of the dielectric; allowing the fluid or molten electrode to conform to surface irregularities of the exposed side of the dielectric to form a conformal electrode; allowing the fluid or molten electrode to harden; separating the conformal electrode from the dielectric; positioning at least one guide between the conformal electrode and the dielectric, the guide providing substantially perpendicular alignment of the conformal electrode with the dielectric during movement; charging the conformal electrode and the integrally attached electrode; displacing either the conformal electrode or at least one of the dielectric and attached electrode in a repeated manner that is substantially perpendicular to a junction of the conformal electrode and dielectric surface, wherein the conformal electrode contacts the dielectric surface during cycles of the repeated displacement; and tapping generated energy from either the conformal electrode or the attached electrode.

DETAILED DESCRIPTION

Variable capacitors are often referred to as varactors (or varicap, tuning diode, etc.), the typical varactor being a semiconductor diode-based device that varies its capacitance based on the impressed voltage across its terminals. The impressed voltage affects the charge density in the depletion zone, thereby affecting the capacitance the varactor exhibits. However, typical varactors are suitable for only low voltage and their capacitance value is usually very small, ranging in the picoFarads.

In view of the above, a new approach to a varactor is described having higher capacitance and range values, as well as systems and methods for harvesting energy by use of the exemplary varactor.

Referring to first principles, capacitance C is defined as $C=q/V$, where q is the charge distribution and V is the resulting voltage. Rearranging the above expression in terms of V results in $V=q/C$ (Eq. 1). It can be seen that if q is held constant and if C decreases, the net result is that V increases. Therefore, if the capacitance C can be reduced, then the voltage V can be increased, and vice versa.

For a fixed symmetrical charge distribution q on an infinitely planar metal-to-dielectric-to-metal interface (i.e., planar capacitor), it is known that the expression for capacitance C can be reduced to the physical parameters as $C=\in A/d$ (Eq. 2), where $\in$ is the permittivity of the dielectric, A is the surface area, and d is the distance between the metal surfaces bounding the dielectric medium. If A is held constant and c is held constant, then C will inversely vary with the distance d. Therefore, by modulating the distance d, the capacitance C can increase or decrease proportionally. Correspondingly, the voltage V in Eq. 1 can be modulated with C for power generation.

A significant factor in Eq. 1 is the permittivity c, which is approximately $8.8542 \times 10^{-12}$ ($C^2 \cdot N^{-1} \cdot m^{-2}$) for an air-based dielectric, where C is Columbs, N is Newtons and m is meters. To increase the capacitance, the dielectric can be replaced from being air to a high permittivity material, such as ceramic or anything other higher dielectric material. It is noted that high permittivity ceramics often have thousands of times the permittivity of air. Maximal capacitance is obtained when high dielectric material completely fills the volume between the metal plates (in a metal-dielectric-metal planar capacitor). That is, there is no "air" or gap between the plates, as air has a low permittivity and presents a degradation of the overall permittivity between the metal plates. This degradation is evident in typical planar varactors, as demonstrated in FIG. 1.

Figure 1:
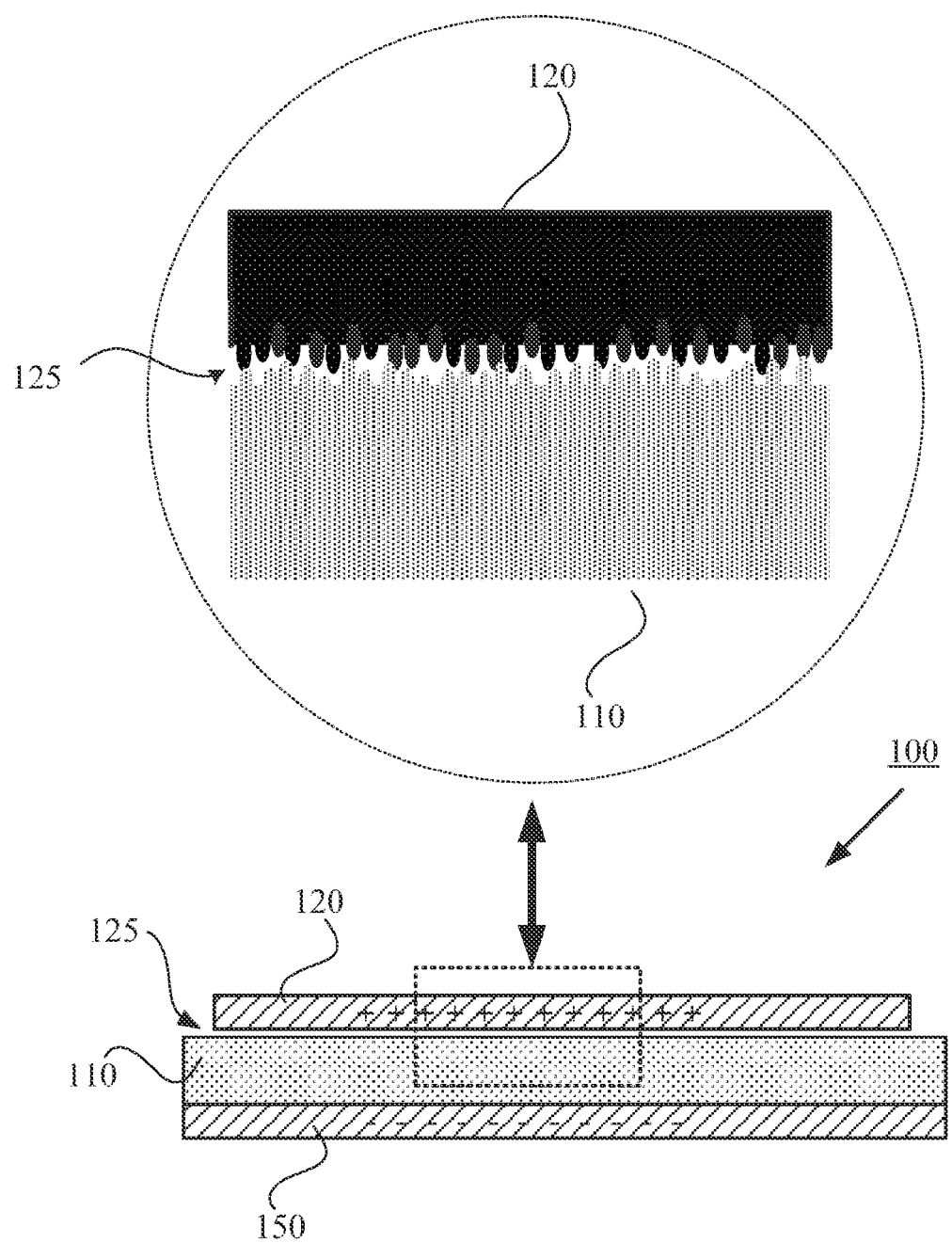
FIG. 1 is an illustration of a related art metal-to-dielectric interface.

FIG. 1 is an illustration of a related art parallel plate capacitor 100, formed with mechanical means, with a dielectric medium 110 between charged metal surfaces 120 and 150. For the purposes of this explanation, it is presumed that the dielectric 110 is a high permittivity material. A blowup of the boundary between the upper metal surface 120 and the dielectric 110 is shown, illustrating that due to the molecularly coarse nature of the metal surface 120 and dielectric 110, there will be an intrinsic air gap 125. This air gap 125 and ensuing low permittivity prevents this related art parallel plate capacitor 100 from obtaining its maximal capacitance value. Therefore, if the upper metal surface 120 is raised and lowered (affecting the distance d—see Eq. 2), the maximal variation in capacitance will be compromised by the air gap's 125 low permittivity.

Figure 2:
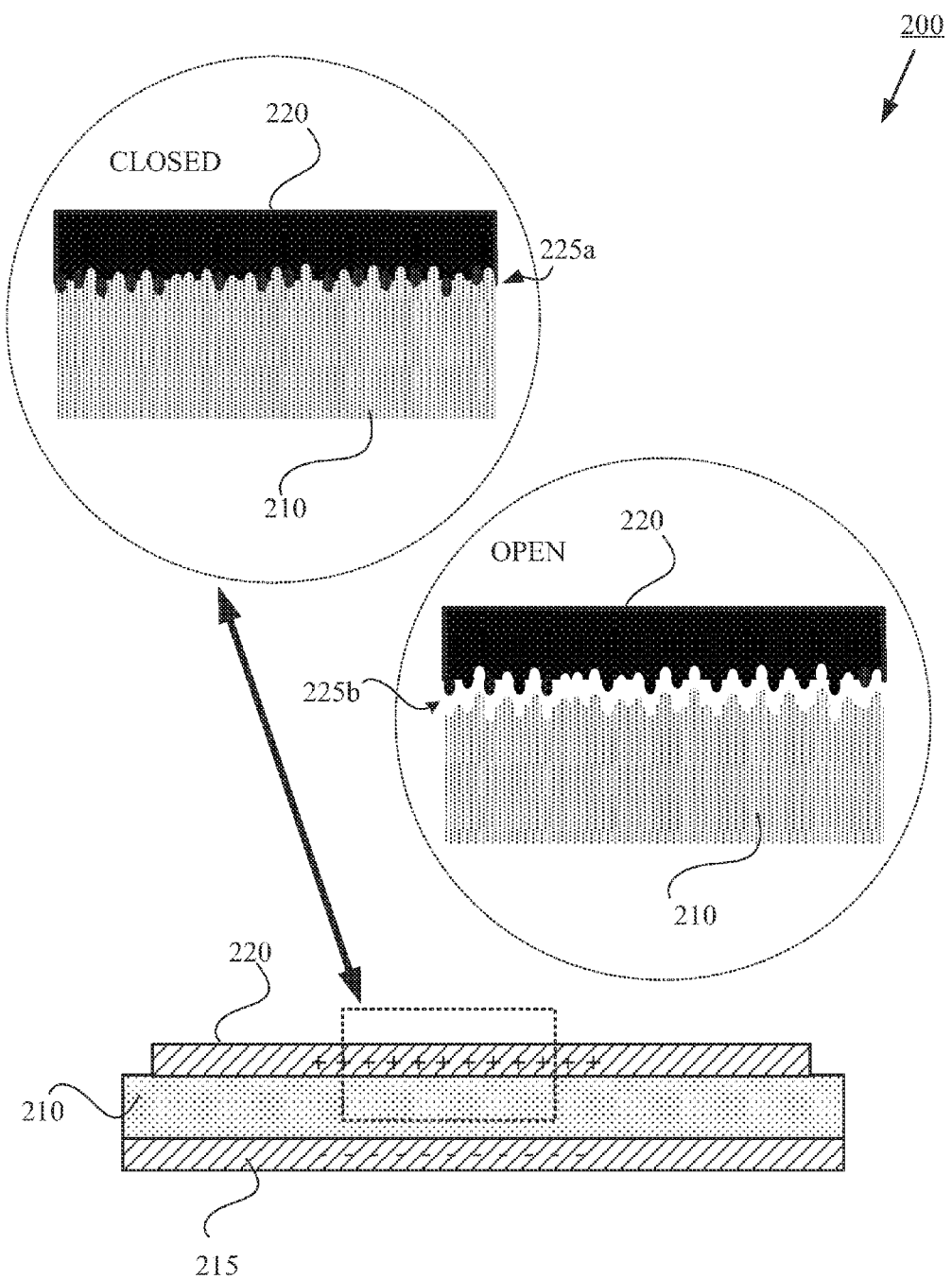
FIG. 2 is an illustration of an exemplary metal-to-dielectric interface.

FIG. 2 is an illustration of an exemplary varactor 200. Instead of mechanically attaching or affixing an upper metal plate/surface 220 to dielectric 210 (bounded on opposite side by metal surface 215), metal surface 220 can be formed by melting it to the exposed surface of dielectric 210. A melting procedure or liquefying procedure will allow metal surface 220 to conform its molecular boundary to match the molecular boundary of dielectric 210. Therefore, any surface roughness or irregularities can be overcome to provide a "matched" upper metal surface 220 to dielectric 210 boundary. Since liquid metal (e.g., solder) may have molecular structures that, even when flexible, cannot "match" every dimension of the dielectric's surface, it is understood that the conforming dimensions are typically less than 10 μm. Principally, by melting the metal or liquefying it, any air gap that may normally fill the mismatched surfaces is removed.

Upper blowup shows practically no air gap at the closed metal-to-dielectric interface 225a. Lower blowup shows air gap 225b when the upper metal surface 220 is lifted from the dielectric 210. The practical absence of an air gap, when the upper metal surface 220 is touching the dielectric 210, significantly affects the capacitance value, enabling the exemplary varactor 200 to have a maximum capacitance value that is within 90% or more the capacitance value of an integrally formed metal plate. Since metal does not bond very well to dielectrics, only a modest amount of effort is needed to detach the cooled metal surface 220 from the surface of dielectric 210.

It should be noted that while the descriptions herein recite "upper," or "lower" or "raised," or "lowered," or "top," or "bottom," it is be understood that these terms are simply used to indicate a relative position or direction of action, and depending on the frame of reference of the desired result, the terms may be interchanged without any loss of specificity. For example, in FIG. 2, the dielectric 210 and "lower" metal surface 215 may be "lowered" from the "upper" metal surface 220, rather than "upper" metal surface 220 being "raised."

In various experiments conducted by the inventor, a high permittivity ($\in_r$ of approximately 1000) dielectric disc made of ceramic sourced from Dimat, Inc., having a barium strontium titanate composition, of approximately 1 inch in diameter and 0.1 inch thickness, was tested using the exemplary approach shown in FIG. 2. The ceramic disc was obtained with one side ("lower") per-silvered (aka—lower electrode). The non-silvered side was covered with melted solder and cooled to form the "upper" metal surface (aka—upper electrode). The cooled solder was separated from the ceramic with only modest pressure. A test of the capacitance with the upper electrode contacting the ceramic revealed a value of approximately 9.8 nF.

The above approach was compared to a ceramic disc of the identical composition and size, but with a non-conforming upper electrode (formed from a metal sheet) contacting the ceramic surface; and also to a fully silvered ceramic disc (both sides are silvered from Dimat, Inc.) The former tested to show a capacitance value of 0.3 nF while the latter showed a capacitance value of 9.9 nF, demonstrating a loss of only 0.1 nF when compared to the inventor-fabricated model. This corresponds to only a 1% decrease over a factory-silvered upper electrode. It is noted that the "metal sheet" capacitor's 0.3 nF value is approximately thirty (30) times lower than the exemplary approach shown in FIG. 2. Therefore, by utilizing a conforming upper electrode, a significant increase in capacitance can be obtained. By pre-charging the electrodes and very slightly modulating the distance from the conforming upper electrode to the dielectric, a variable voltage source can be obtained and used for energy/power generation.

The energy producing capacity can be demonstrated by the following example. An exemplary embodiment can be constructed that has a closed gap, maximum capacitance $C_{max}$ that is fifty (50) times larger than the open gap, minimum capacitance $C_{min}$ (e.g., $C_{min}=1;50C_{max}$). An open gap, pre-charging voltage of $V_0=100$ V can be impressed across the electrodes from, for example, a voltage source and a high impedance series resistor to minimize charging current across the electrodes, resulting in the maximum voltage $V_{max}=50V_0$. Since energy is defined as $E=\frac{1}{2} CV^2$, then minimum energy $E_0=\frac{1}{2} C_{min} V_0^2$, whereas maximum energy is $E_{max}=\frac{1}{2} C_{max} V_{max}^2 = \frac{1}{2} \cdot 1 ; 50 C_{min} (50 V_0)^2 = 50 E_0$. A fifty fold increase can be obtained, using this one example. If N multiple exemplary varactors are positioned together or networked, an N-fold increase in energy/power can be obtained.

Figure 3:
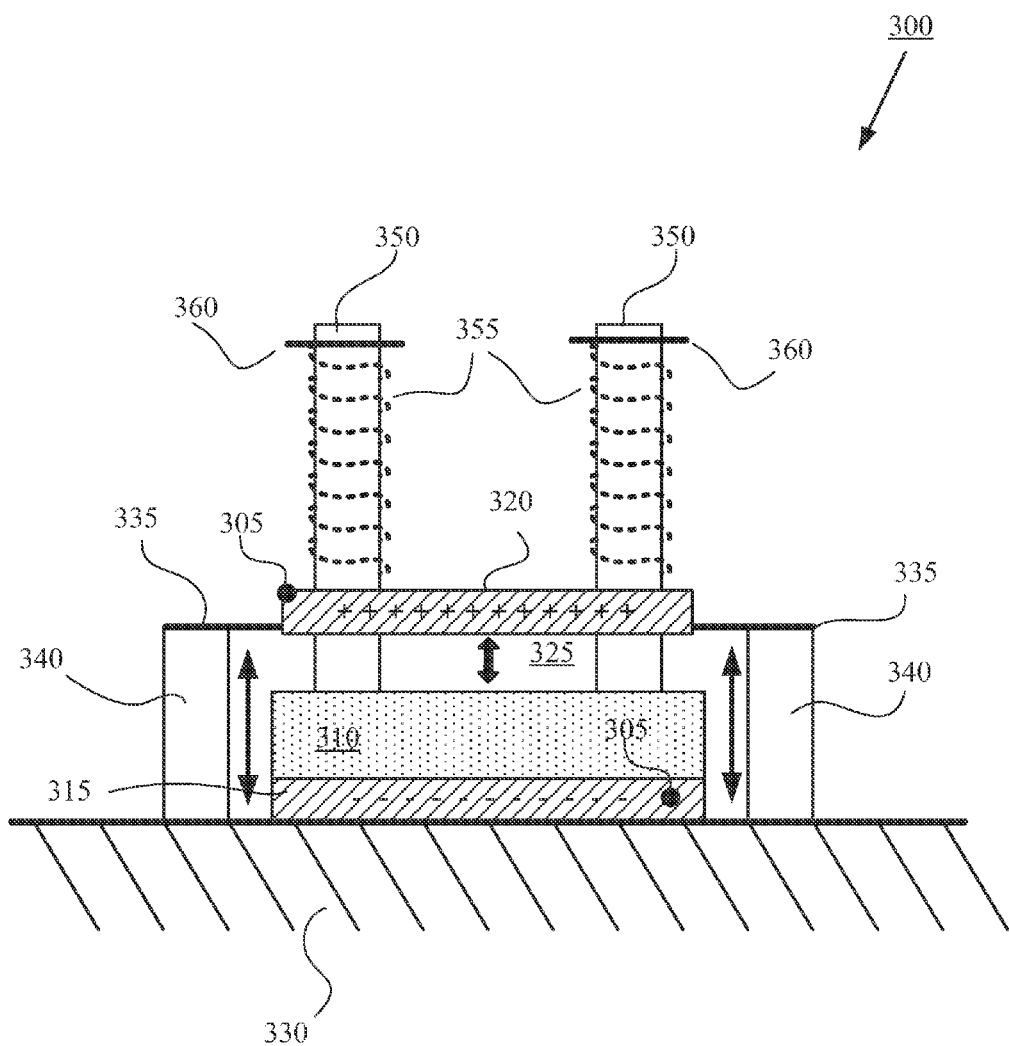
FIG. 3 is an illustration of an exemplary energy harvesting engine.

FIG. 3 is an illustration of an exemplary energy harvesting engine 300 including an exemplary variable capacitor 200 of FIG. 2, with actuators 340 coupled via arms 335 to pre-charged conforming upper electrode 320. Pre-charged lower electrode 315 is stabilized or affixed, for example, to ground 330 to prevent movement of the lower electrode 315 and dielectric 310. The charge type (+ or −) is arbitrary and may be reversed, depending on the connection configuration which is denoted by contacts 305.

Registration guides or precision guide rods 350 are shown "penetrating" through vias (not shown) in conforming upper electrode 320, which stabilize and prevent lateral movement of conforming upper electrode 320 when being raised by actuators 340. In the configuration shown in FIG. 3, the conforming upper electrode 320 "slides" through registration guides 350 and are understood to be non-conducting. Other forms of allowing registration guides 350 to keep the conforming upper electrode 320 in alignment with dielectric 310 may be utilized. For example, registration guides 350 may be situated outside of the conforming upper electrode 320, going through vias in arms 335. Accordingly, various modifications and changes to how the conforming upper electrode's 320 lateral position is maintained with respect to dielectric's 310 position may be made without departing from the spirit and scope of this disclosure.

Continuing with FIG. 3, optional springs or return mechanisms 355 are positioned around registrations guides 350, secured by retainer 360, to provide an automatic mechanism for forcing lifted conforming upper electrode 320 back to the surface of dielectric 310. In some embodiments, gravity may provide sufficient force to cause conforming upper electrode 320 to return to a dielectric surface contacting position. Of course, any form of return mechanism may be utilized, according to design preference.

Actuators 340 may be formed from piezoelectric materials (for example, lead-zirconium-titanium (PZT)) and so forth. Any form of movement generating device or mechanism can be used, as applicable, for actuators 340 to cause the conforming upper electrode 320 to displace itself from the surface of dielectric 310. In fact, depending on the type of motion generating source, springs may used as the actuators 340, with the entire assembly being displaced, for example, by environmental movement or vibration—from an open air gap position to a closed (no air gap) position.

Figure 4:
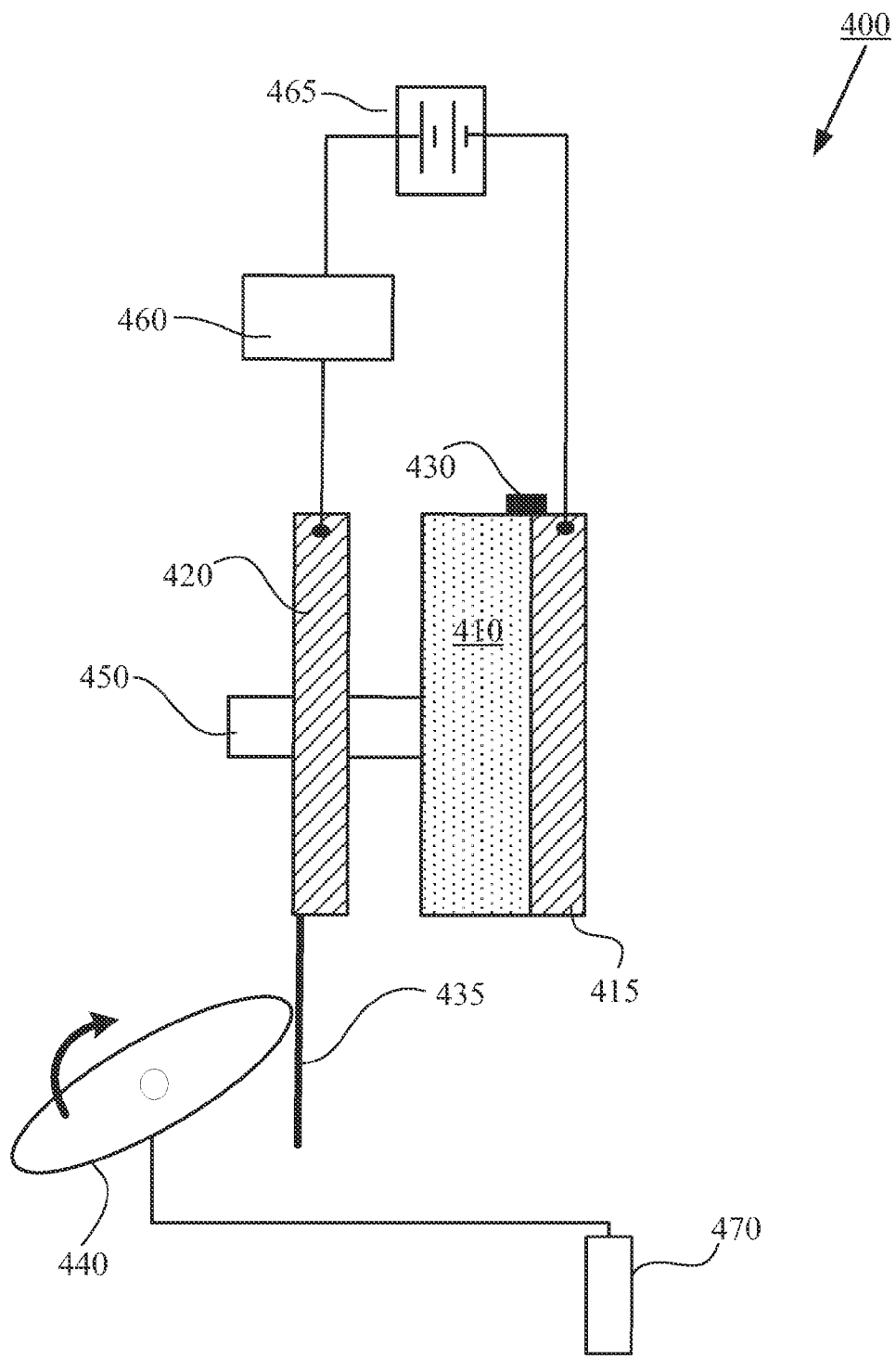
FIG. 4 is an illustration of an exemplary electrical generator/energy harvesting configuration.

FIG. 4 is an illustration of an exemplary energy harvesting configuration 400 using a single registration guide 450 and single arm 435 attached to conforming upper electrode 420. Movement of the conforming upper electrode 420 is achieved via eccentric cam 440 that is rotated/powered by power source 470, which can be any one or more of motion generating systems, including but not limited to, solar powered motor, wind, vibration, tidal, heat, and so forth. The assembly formed by dielectric 410 and lower electrode 415 is secured via mount 430, preventing the assembly from moving while conforming upper electrode 420 is moving. A tapped voltage output of the conforming upper electrode 420 (or, alternatively, the lower electrode 415) can be obtained by channeling the modulated voltage to rectifier 460 to charge storage unit/battery 465. In this example, a DC generator is obtained by the rectified output. Based on the above examples, a system of networked power generators can be developed.

Figure 5:
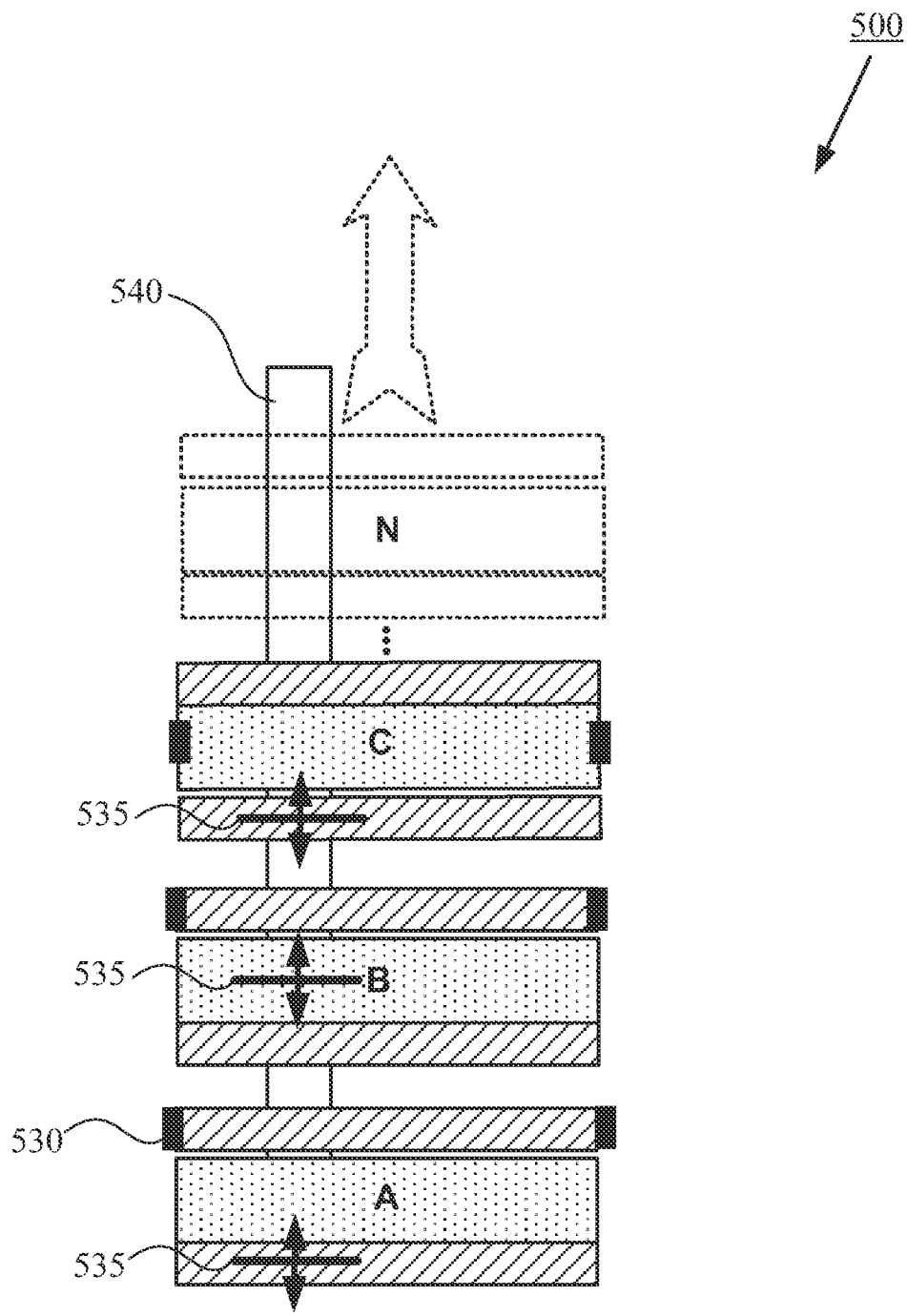
FIG. 5 is an illustration of another exemplary electrical generator/energy harvesting configuration.

FIG. 5 is an illustration of another exemplary energy harvesting configuration 500 showing a stack of three (3) or more exemplary units A, B, C, and optional unit N. In this configuration, the exemplary units are vertically stacked (to minimize space requirements), and an actuating arm 540 that moves up and down is coupled via a coupler or connection 535 to the respective moving element in the units. Depending on design implementation, the stack could be horizontal or any combination of directions. For ease of description, electrical connections are not shown.

In this example, actuating arm 540, via its movement, forces the upper electrode in unit A to move up and down, and similarly the dielectric/lower electrode assembly for unit B, and also for the reversed upper electrode for unit B. The non-moving elements of the units are fixed, indicated by element 530. Depending on design implementation and alignment tolerances, actuating arm 540 can travel through the interior of the elements through a via (not shown), or may be external to the elements. If interior to the elements, actuating arm 540 can also operate as a registration guide. It is noted that in this example, unit C's arrangement of elements is reversed from that shown in the earlier embodiments.

In view of the above, it should be apparent than any arrangement of units that achieves the desired movement may be contemplated. For example, two (2) actuating arms may be used, one that moves one set of elements in one direction, while the other actuating arm moves the complementary set of elements in the opposite direction. That is, no element is stationary and movement of both the dielectric and upper electrode towards and away from each other may be developed. Accordingly, it is understood that various modifications and changes may be made to the embodiments without departing from the spirit and scope of this disclosure.

As opposed to variable capacitors that are available, the exemplary varactor described herein can handle higher applied power. Its variability is derived from changing the air gap of its conforming electrode to the dielectric insert. The gap can be changed from near zero to any desired gap thickness. As such, this new varactor can be used as a direct energy converter, converting mechanical energy to electrical energy at high efficiency with minimal motion. The exemplary embodiments are not dependent on frequency as is the case with magnetic generators. At very low frequencies a magnetic generator will not produce any significant output power, whereas the exemplary variable capacitor generator will continue to output power. The exemplary embodiments are also not dependent on the shape of the dielectric. That is, curved surface dielectrics or angled, or any variation that enables the top electrode to be "molded" thereto, can be used. In addition to energy harvesting uses, the exemplary varactor can be used in parametric amplifiers, parametric oscillators and voltage-controlled oscillators as part of phase-locked loops and frequency synthesizers.

In view of the above, it will be understood that many additional changes in the details, materials, steps and arrangement of parts, which have been herein described and illustrated to explain the nature of the disclosure, may be made by those skilled in the art within the principal and scope of the disclosure as expressed in the appended claims.

What is claimed is:

1. A variable capacitor (varactor), comprising:
a solid dielectric having two opposing sides, with an integrally attached charged electrode on one side of the dielectric and the exposed other side having a dielectric molecular boundary;
a conformal electrode having an opposite charge than the integrally attached electrode, said conformal electrode being in an initial fluid or molten state and being melted onto the exposed other side of the dielectric, to establish a conformal electrode molecular boundary that substantially conforms to said dielectric molecular boundary when said conformal electrode solidifies, and being removably displaceable from the dielectric;
a guide extending through both the conformal electrode and the dielectric, providing substantially perpendicular alignment of the conformal electrode with the other side surface of the dielectric during movement; and
a displacement mechanism coupled to either the conformal electrode or to at least one of the dielectric and attached electrode, providing displacement substantially perpendicular to a junction of the conformal electrode and dielectric surface, wherein a capacitance is varied by displacing the conformal electrode from a surface of the exposed side of the dielectric.

2. The varactor of claim 1, wherein the displacement mechanism's source of movement is from at least one of a mechanical, piezoelectric, vibrational, and wind-generated origin.

3. The varactor of claim 1, further comprising a coupler coupled to the conformal electrode, preventing movement of the conformal electrode, wherein the displacement mechanism is coupled to at least one of the dielectric and the attached electrode.

4. The varactor of claim 1, wherein the guiding mechanism travels through a via disposed in at least one of the conformal electrode and the dielectric.

5. A varactor-based electrical power generator, comprising:
- a solid dielectric having two opposing sides, with an integrally attached charged electrode on one side of the dielectric and the exposed other side having a dielectric molecular boundary;
- a conformal electrode having an opposite charge than the integrally attached electrode, said conformal electrode being in an initial fluid or molten state and being melted onto the exposed other side of the dielectric, to establish a conformal electrode boundary that substantially conforms to said dielectric molecular boundary when said conformal electrode solidifies, and being removably displaceable from the dielectric;
- a guide extending through both the conformal electrode and the dielectric, providing substantially perpendicular alignment of the conformal electrode with the other side surface of the dielectric during movement;
- a displacement mechanism coupled to the either the conformal electrode or to at least one of the dielectric and the attached electrode, providing repeating displacement substantially perpendicular to a junction of the conformal electrode and dielectric surface, wherein a capacitance is varied by varying a displacement between the conformal electrode and a surface of the exposed side of the dielectric, and
- a power storage device coupled in series to either the conformal electrode or the attached electrode, storing generated power.

6. The generator of claim 5, further comprising a rectifier coupled in series to the conformal electrode.

7. The generator of claim 5, wherein the displacement mechanism's source of movement is from at least one of a mechanical, piezoelectric, vibrational, and wind-generated origin.

8. The generator of claim 1, wherein the guiding mechanism travels through a via disposed in at least one of the conformal electrode and the dielectric.

9. A varactor-based method for generating electrical power, comprising:
- melting an electrode onto an exposed side of a solid dielectric having an integrally attached electrode on a non-exposed side of the dielectric, said exposed side having a dielectric molecular boundary;
- allowing the fluid or molten electrode to form a conformal electrode;
- allowing the fluid or molten electrode to harden to establish a conformal electrode molecular boundary that conforms to said dielectric boundary;
- separating the conformal electrode from the dielectric;
- positioning a guide between the conformal electrode and the dielectric, the guide providing substantially perpendicular alignment of the conformal electrode with the dielectric during movement;
- charging the conformal electrode and the integrally attached electrode;
- displacing either the conformal electrode or at least one of the dielectric and attached electrode in a repeated manner that is substantially perpendicular to a junction of the conformal electrode and dielectric surface, wherein the conformal electrode contacts the dielectric surface during cycles of the repeated displacement; and
- tapping generated energy from either the conformal electrode or the attached electrode.

10. The method of claim 9, further comprising storing the tapped energy.

11. The method of claim 9, wherein the displacement is from at least one of a mechanical, piezoelectric, vibrational, and wind-generated origin.

* * * * *